(12) United States Patent  
HenneBarrows et al.

(10) Patent No.: US 12,137,839 B2
(45) Date of Patent: *Nov. 12, 2024

(54) AUTOMATED FOOD PREPARATION SYSTEM

(71) Applicant: CFA Properties, Inc., Atlanta, GA (US)

(72) Inventors: Ryan HenneBarrows, Atlanta, GA (US); Harrison Goldberg, Atlanta, GA (US); Aaron Hill, Atlanta, GA (US); Brandon Whitt, Atlanta, GA (US)

(73) Assignee: CFA Properties, Inc., Atlanta, GA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/187,075

(22) Filed: Mar. 21, 2023

(65) Prior Publication Data

US 2023/0276990 A1 Sep. 7, 2023

Related U.S. Application Data

(63) Continuation of application No. 17/015,322, filed on Sep. 9, 2020, now Pat. No. 11,633,065.

(Continued)

(51) Int. Cl.
*A47J 37/12* (2006.01)
*A47J 36/32* (2006.01)
(Continued)

(52) U.S. Cl.
CPC .......... *A47J 37/1219* (2013.01); *A47J 36/32* (2013.01); *A47J 37/1266* (2013.01);
(Continued)

(58) Field of Classification Search
CPC .......... B25J 9/26; B25J 11/0045; B65G 65/23
See application file for complete search history.

(56) References Cited

U.S. PATENT DOCUMENTS 4,922,435 A * 5/1990 Cahlander .......... G07F 17/0078
99/325
5,132,914 A * 7/1992 Cahlander ............... A47J 27/14
700/211
(Continued)

FOREIGN PATENT DOCUMENTS

WO      WO-91/09558 A1    7/1991
WO      WO-2019/108909 A1   6/2019
WO      WO-2019/136406 A1   7/2019

OTHER PUBLICATIONS

U.S. Appl. No. 17/015,322, filed Sep. 9, 2020, U.S. Pat. No. 11,633,065.

(Continued)

*Primary Examiner* — John J Norton
(74) *Attorney, Agent, or Firm* — ALSTON & BIRD LLP

(57) ABSTRACT

Example embodiments of the present disclosure are directed to food preparation systems and associated automated gantry systems. An example automated food preparation system may include a housing that supports one or more baskets therein and a gantry system. The gantry system may include a retrieval arm and a drive system operably coupled with the retrieval arm. The drive system may cause movement of the retrieval arm in at least two directions relative to the housing. In operation, the retrieval arm may engage a basket and cause movement of the basket about the housing. In some instances, an ejection mechanism is provided that receives the basket from the retrieval arm and causes removal of the contents of the basket.

10 Claims, 15 Drawing Sheets

Related U.S. Application Data

(60) Provisional application No. 62/897,753, filed on Sep. 9, 2019.

(51) Int. Cl.
  *B25J 9/02* (2006.01)
  *B25J 11/00* (2006.01)
  *B25J 13/08* (2006.01)
  *B25J 15/00* (2006.01)
  *B65G 65/23* (2006.01)

(52) U.S. Cl.
  CPC ........... *A47J 37/1295* (2013.01); *B25J 9/026* (2013.01); *B25J 11/0045* (2013.01); *B25J 13/088* (2013.01); *B25J 15/00* (2013.01); *B65G 65/23* (2013.01); *A47J 2202/00* (2013.01)

(56) References Cited

U.S. PATENT DOCUMENTS

| | | |
|---|---|---|
| 5,142,968 A | 9/1992 | Caron et al. |
| 2005/0268792 A1 | 12/2005 | Wu Chang |
| 2011/0011278 A1 | 1/2011 | Jones et al. |
| 2018/0160853 A1 | 6/2018 | Miyoshi |
| 2020/0305646 A1* | 10/2020 | Hohler ................ A47J 37/1266 |
| 2020/0345179 A1 | 11/2020 | Barandun et al. |

OTHER PUBLICATIONS

International Search Report and Written Opinion for Application No. PCT/IB2020/058385, dated Dec. 17, 2020 (13 pages), European Patent Office, Rijswijk, Netherlands.

* cited by examiner

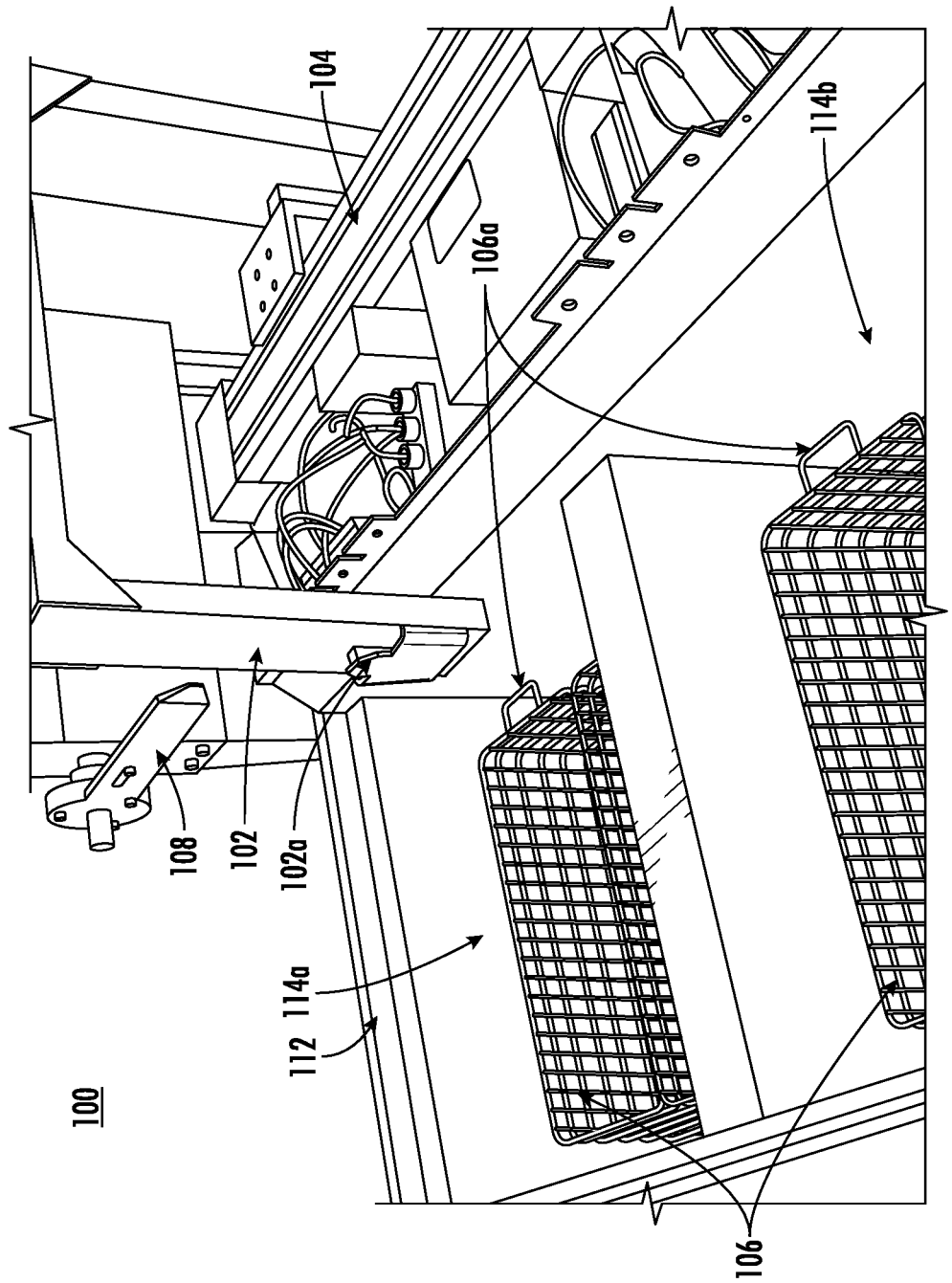

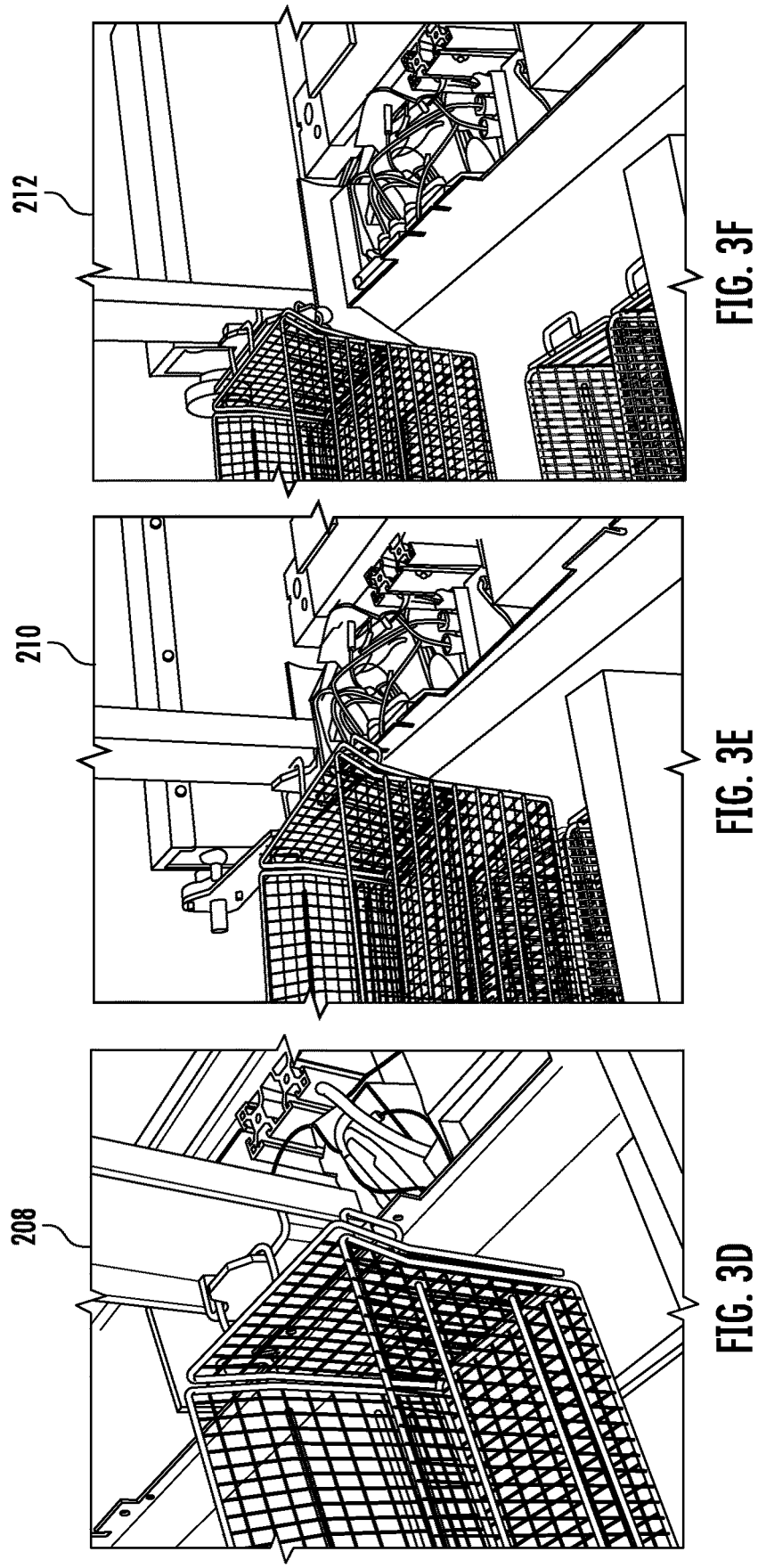

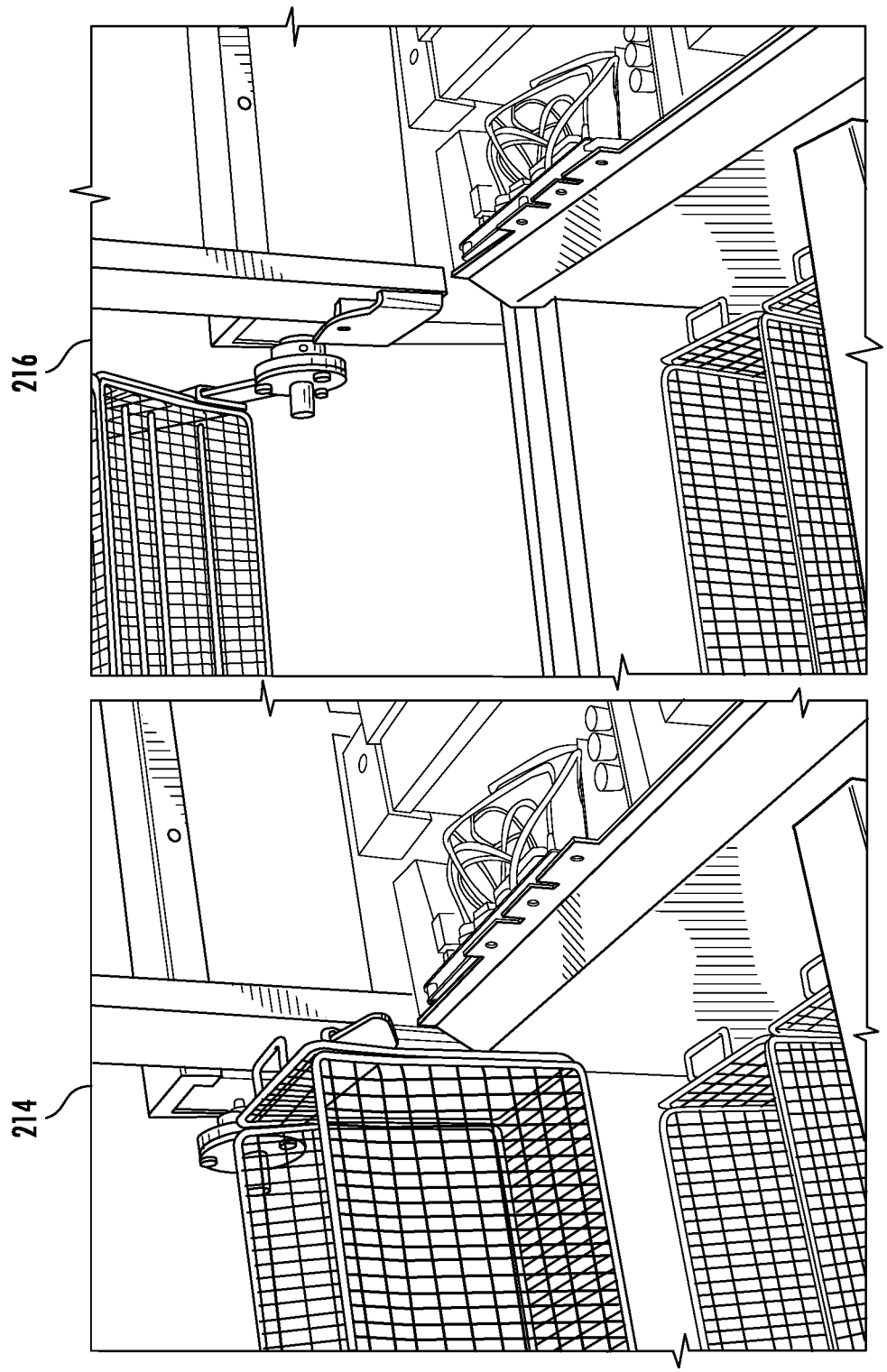

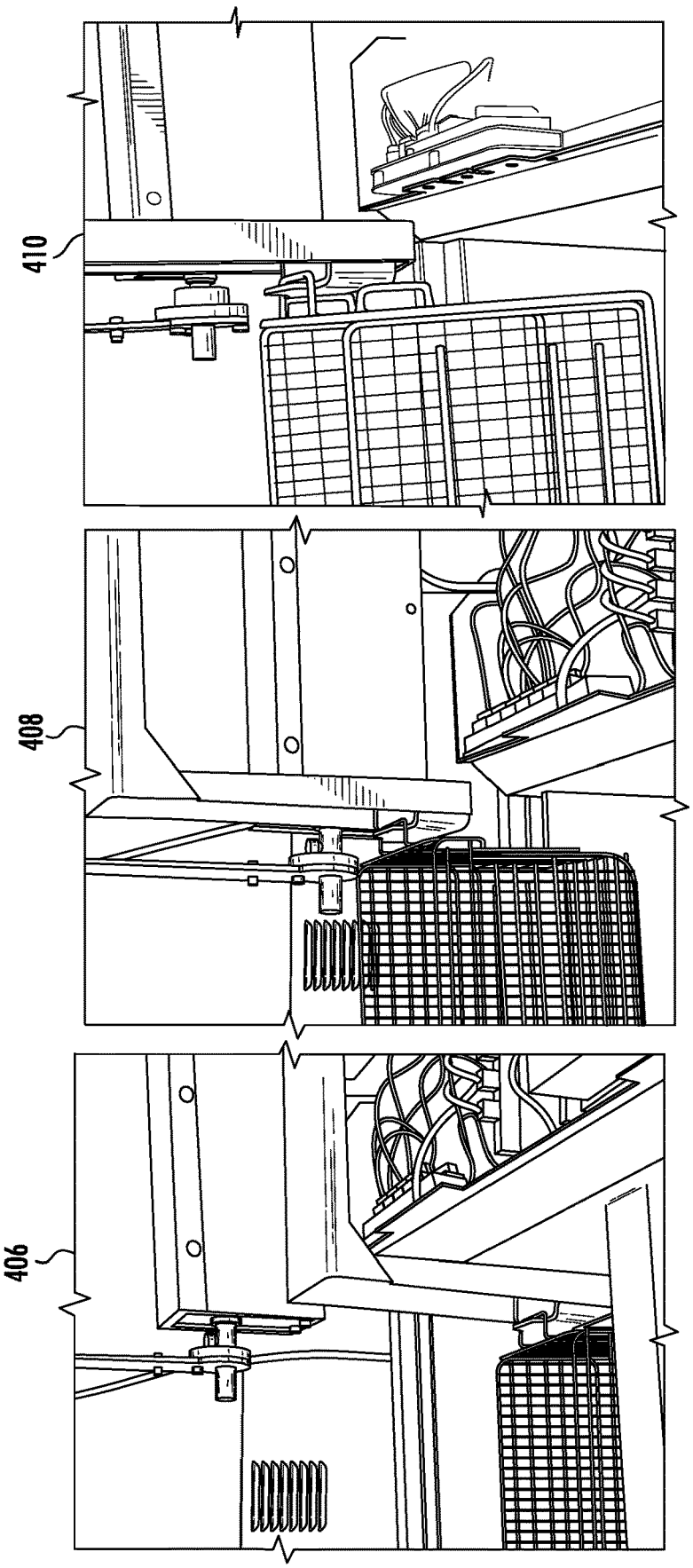

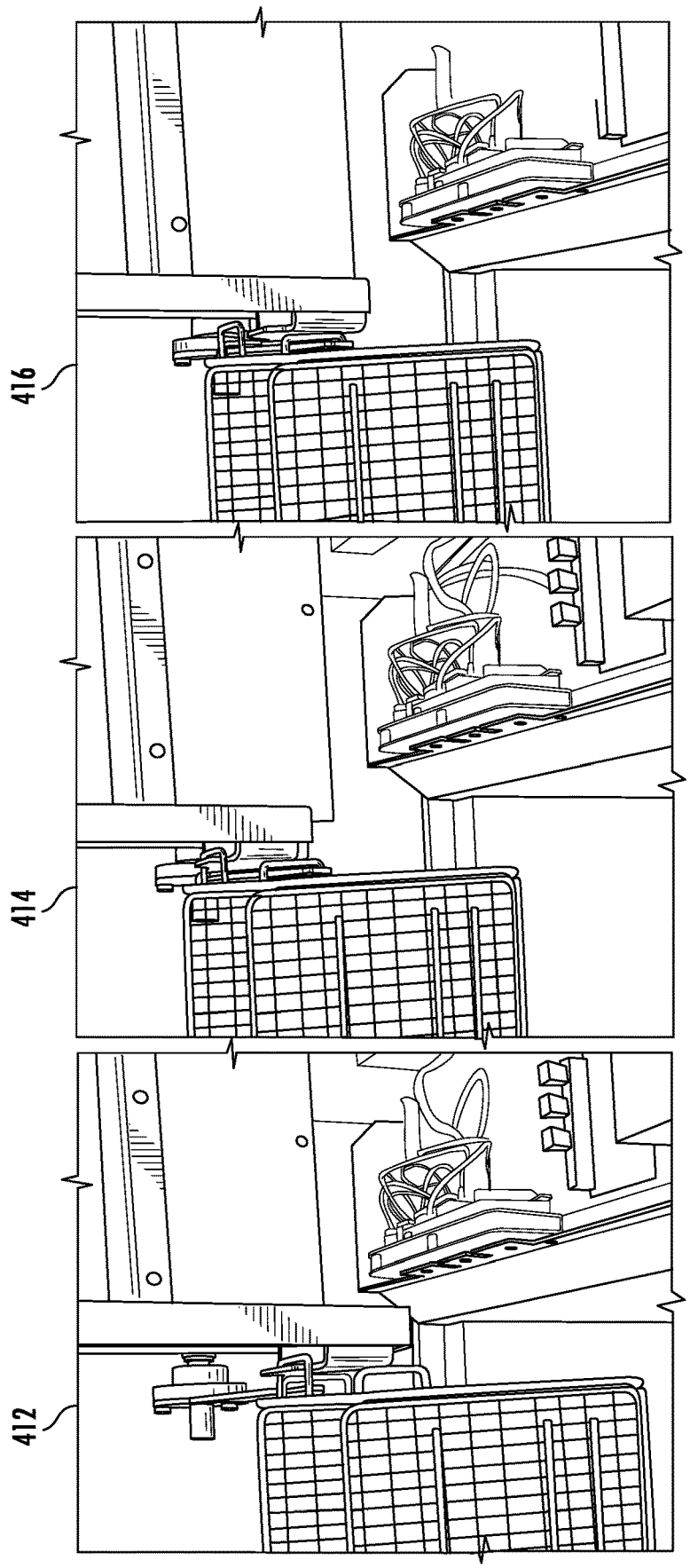

AUTOMATED FOOD PREPARATION SYSTEM

CROSS-REFERENCE TO RELATED APPLICATIONS

This application is a continuation of U.S. Non-Provisional application Ser. No. 17/015,322, filed Sep. 9, 2020, which claims the benefit of U.S. Provisional Application No. 62/897,753, filed Sep. 9, 2019, which is hereby incorporated by reference.

TECHNOLOGICAL FIELD

Example embodiments of the present invention related generally to food service systems and, more particularly, to automated food preparation and associated dispensing systems.

BACKGROUND

The food service industry relies upon quickly providing customers with freshly prepared food items. Cooking apparatuses (e.g., frying systems, grills, microwaves, etc.) may be utilized in this process to cook various food products made-to-order (e.g., poultry products, potato products, etc.). These cooking apparatuses may include several interworking elements, subsystems, or the like used to prepare each food item for a customer's order. By way of example, a frying system may include multiple cooking oil reservoirs, sensors, and/or heating elements and may further be formed in conjunction with other kitchen equipment (e.g., refrigerators, grills, warming stations, or the like).

BRIEF SUMMARY

Example embodiments of the present disclosure are directed to food preparation systems and associated automated gantry systems. An example automated food preparation system may include a housing configured to support one or more baskets therein and a gantry system. The gantry system may include a retrieval arm and a drive system operably coupled with the retrieval arm. The drive system may be configured to cause movement of the retrieval arm in at least two directions relative to the housing. In operation, the retrieval arm may be configured to engage a basket and cause movement of the basket about the housing.

In some embodiments, the housing may further define a reservoir configured to support a cooking medium therein. In such an embodiment, the reservoir further may further define a first reservoir and a second reservoir each configured to, in operation, support at least one basket therein. In some further embodiments, the system may include a temperature control element in thermal engagement with the cooking medium and configured to modify the temperature of the cooking medium. In some still further embodiments, the system may include one or more temperature sensors in thermal engagement with the reservoir and configured to determine the temperature of the cooking medium therein.

In some embodiments, the retrieval arm may include an engagement feature configured to engage a corresponding feature of the basket.

In some embodiments, the drive system may further include at least one vertical rail configured to facilitate linear motion of the retrieval arm in a vertical direction and at least one horizontal rail configured to facilitate linear motion of the retrieval arm in a horizontal direction. In such an embodiment, the drive system may further include a drive motor coupled to one or more of the horizontal rail or the vertical rail and configured to cause movement of the retrieval arm.

In some embodiments, the gantry system may further include control circuitry configured to control operation of the retrieval arm. In such an embodiment, the automated food preparation system may also include one or more positional sensors communicably coupled with the control circuitry and configured to detect the position of the retrieval arm relative to the housing.

In some embodiments, the system may include an ejection mechanism configured to, in operation, receive the basket from the retrieval arm and cause removal of the contents of the basket. In such an embodiment, the ejection mechanism may further define an elongate member that extends from a pivotal attachment with the housing. In some further embodiments, the ejection mechanism may include a motor shaft configured to, in operation, cause rotation of the elongate member about the pivotal attachment. In operation, the motor shaft may be configured to rotate the elongate member from a first position configured to receive the basket and a second position opposite the first position at which the contents of the basket are ejected.

A gantry system for use in food preparation is also provided. The system may include a retrieval arm and a drive system operably coupled with the retrieval arm. The drive system may be configured to cause movement of the retrieval arm in at least two directions relative to a housing. In operation, the retrieval arm may be configured to engage a basket supported by the housing and cause movement of the basket about the housing.

In some embodiment, the retrieval arm may include an engagement feature configured to engage a corresponding feature of the basket.

In some embodiments, the drive system may include at least one vertical rail configured to facilitate linear motion of the retrieval arm in a vertical direction and at least one horizontal rail configured to facilitate linear motion of the retrieval arm in a horizontal direction. In such an embodiment, the drive system may further include a drive motor coupled to one or more of the horizontal rail or the vertical rail and configured to cause movement of the retrieval arm.

In some embodiments, the gantry system may further include control circuitry configured to control operation of the retrieval arm. In such an embodiment, the gantry system may also include one or more positional sensors communicably coupled with the control circuitry and configured to detect the position of the retrieval arm relative to the housing.

BRIEF DESCRIPTION OF THE SEVERAL VIEWS OF THE DRAWINGS

Figure 1A:
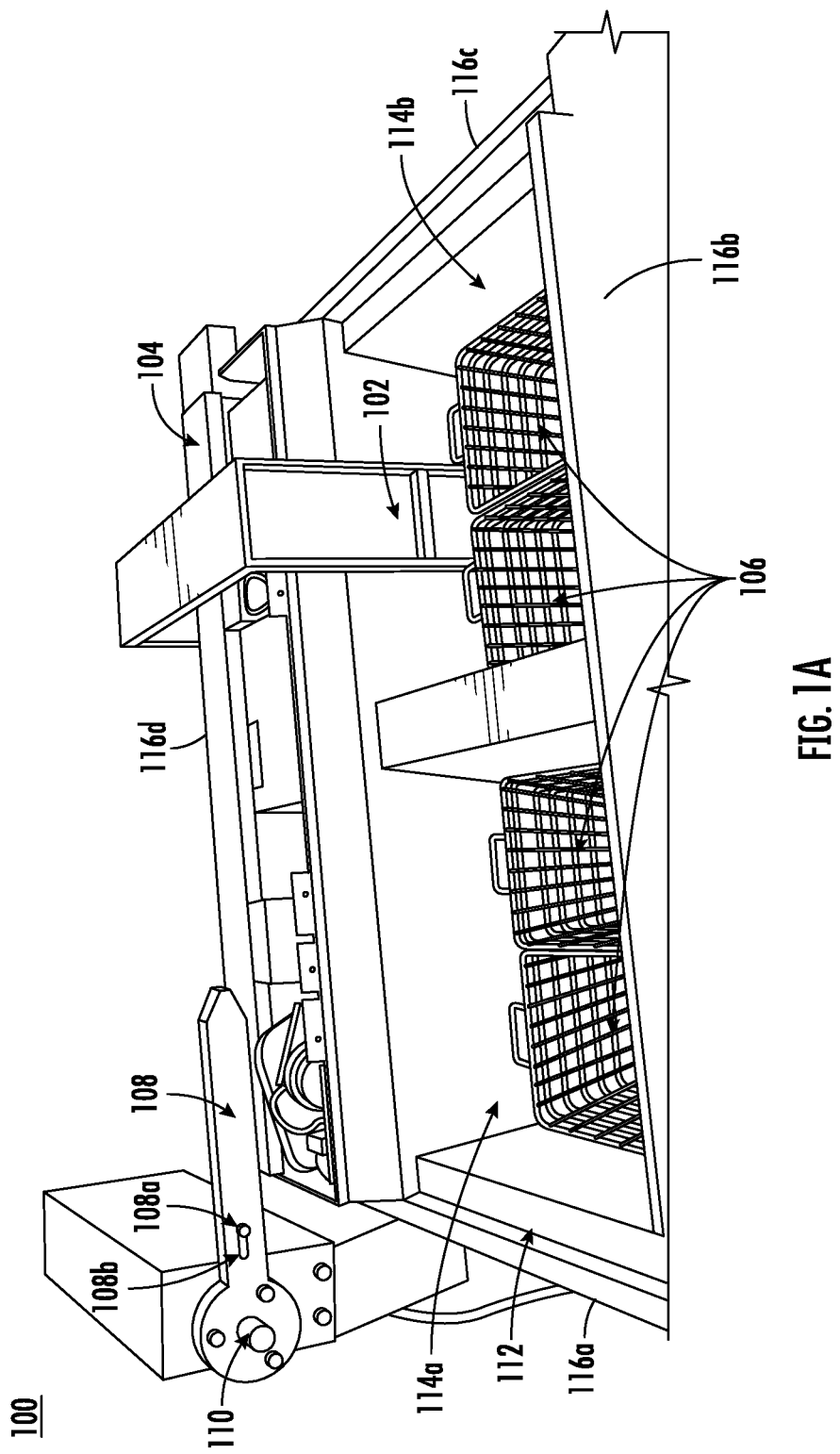
Figure 1C:
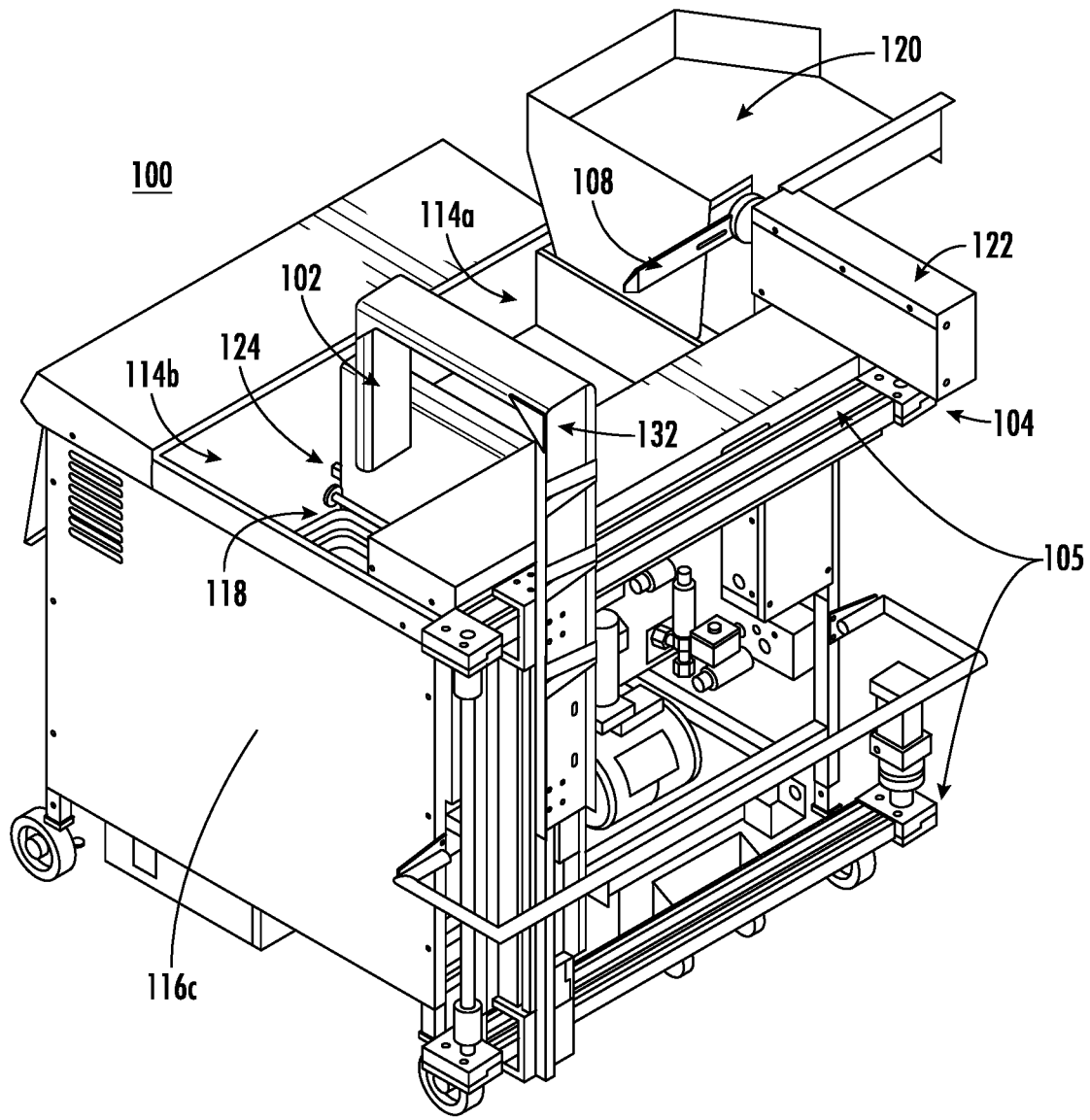
Figure 1D:
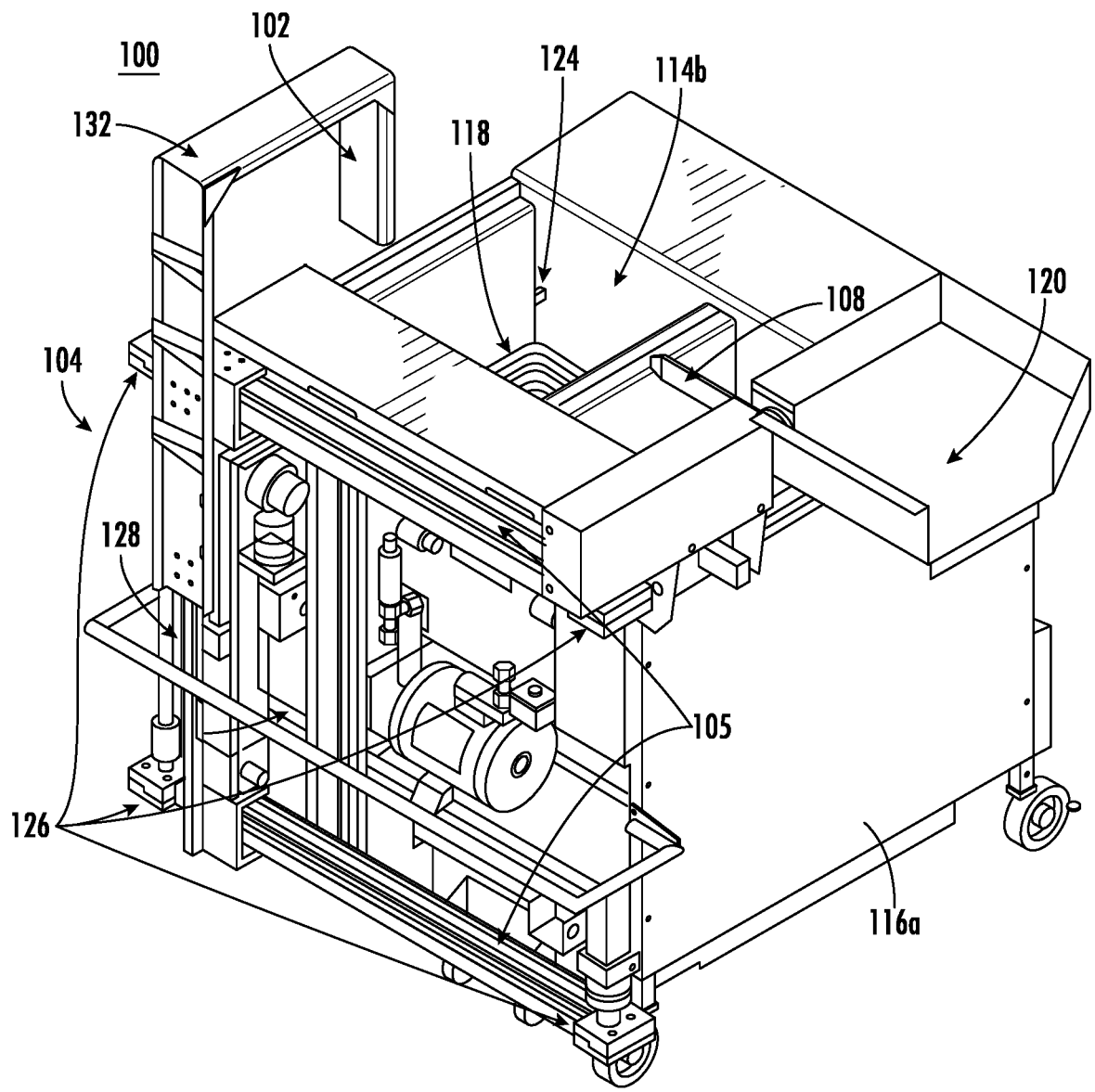
Figure 1E:
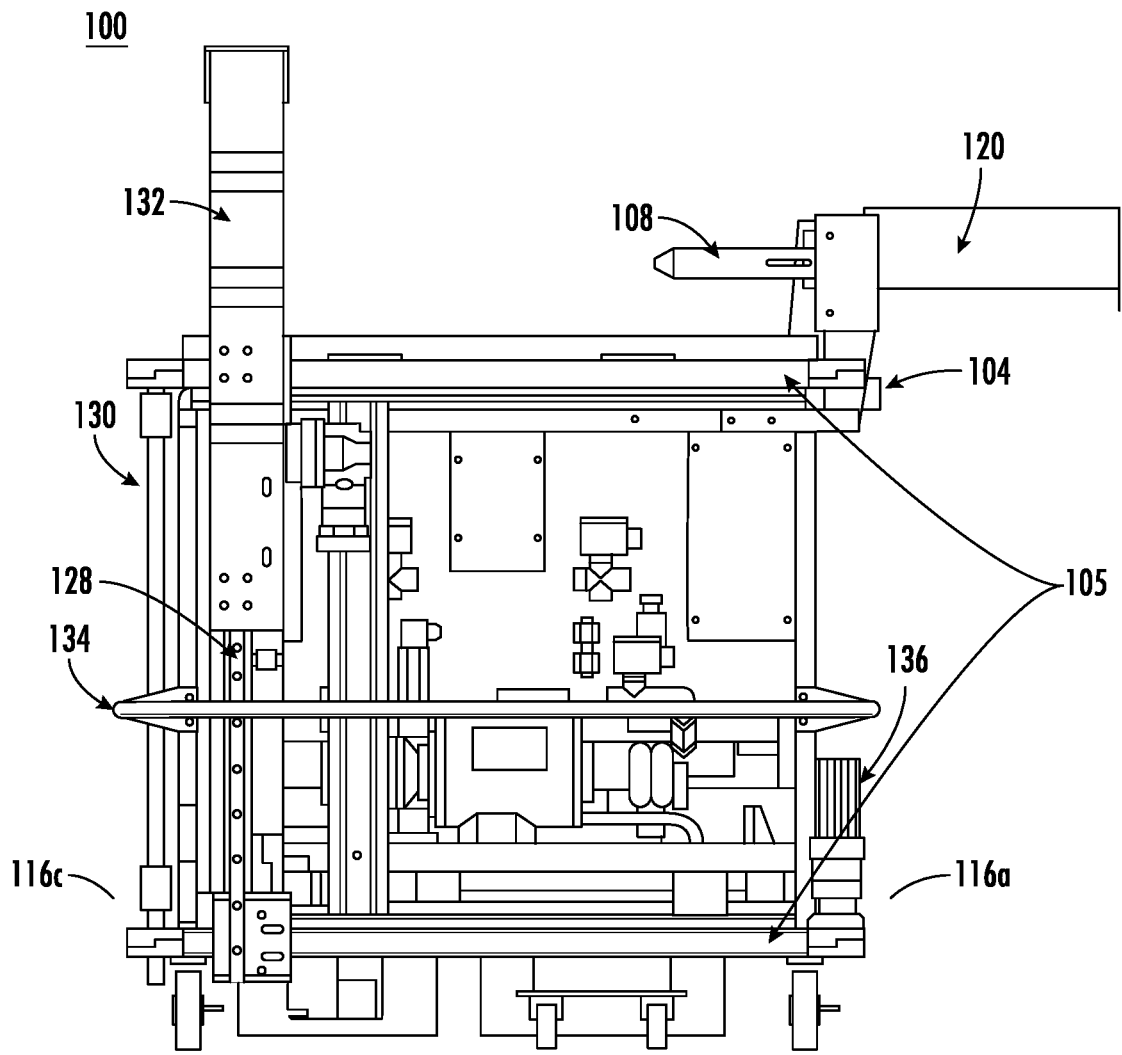
Figure 2:
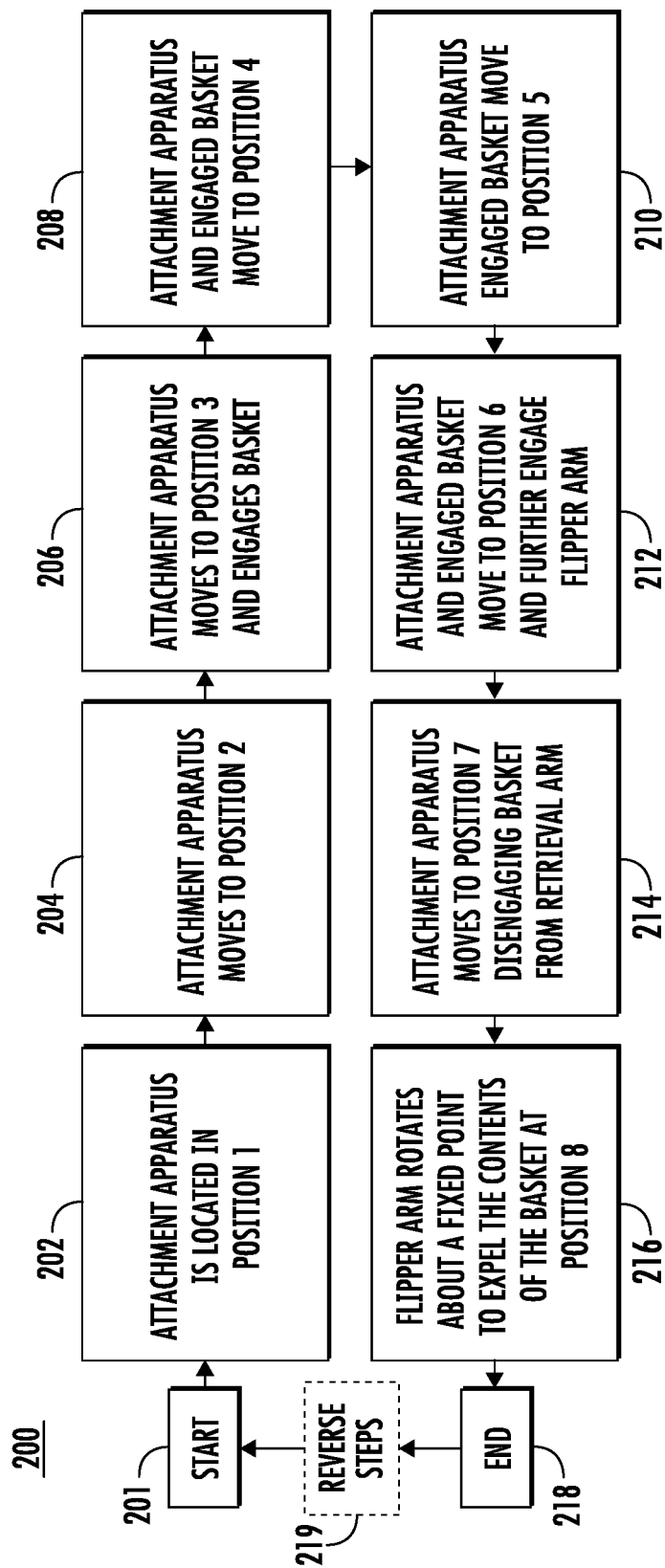

Having thus described the invention in general terms, reference will now be made to the accompanying drawings, which are not necessarily drawn to scale, and wherein:

FIGS. 1A-1E illustrate an automated food preparation system according to various example embodiments;

FIG. 2 illustrates a flow chart depicting a movement operation cycle of the automated food preparation system of FIGS. 1A-1E according to an example embodiment;

FIGS. 3A-3H illustrate the movement operation cycle of FIG. 2 with respect to a second reservoir according to an example embodiment;

FIGS. 4A-4I illustrate a movement operation cycle of the automated food preparation system with respect to a first reservoir according to an example embodiment.

Figure 5:
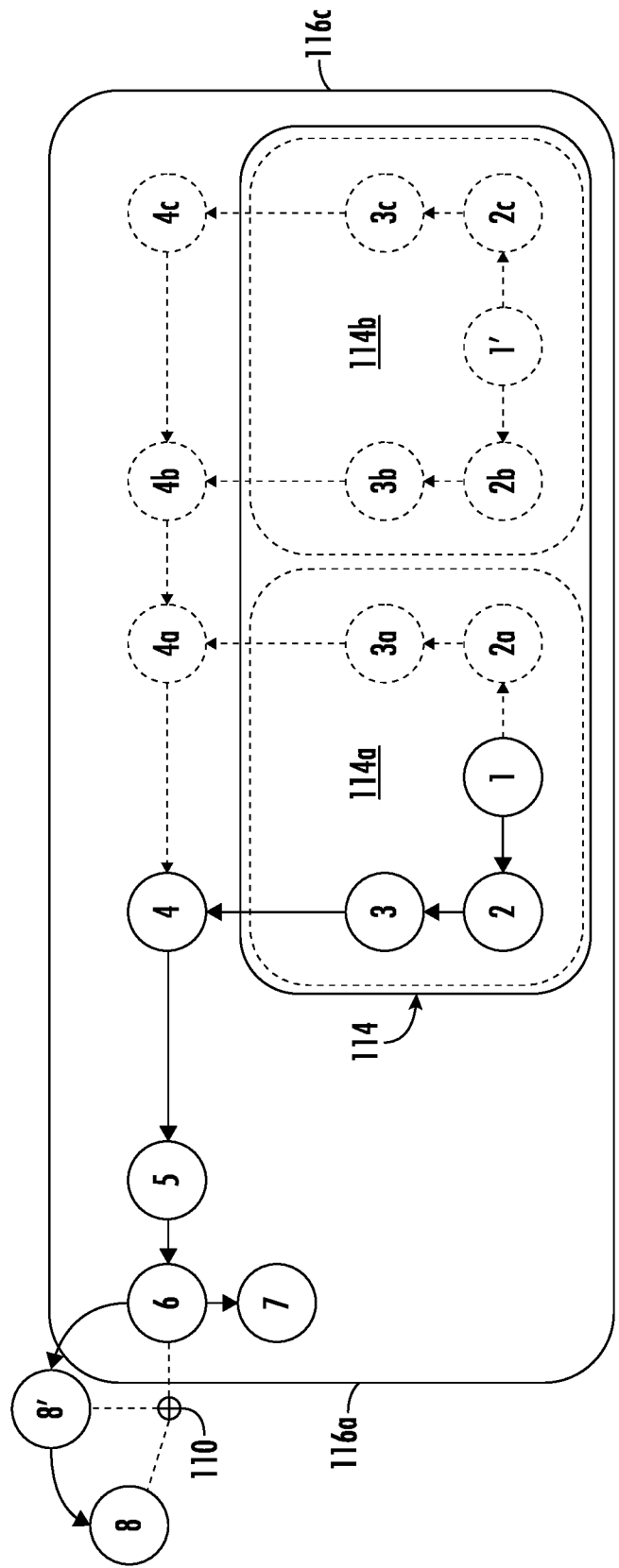
Figure 6:
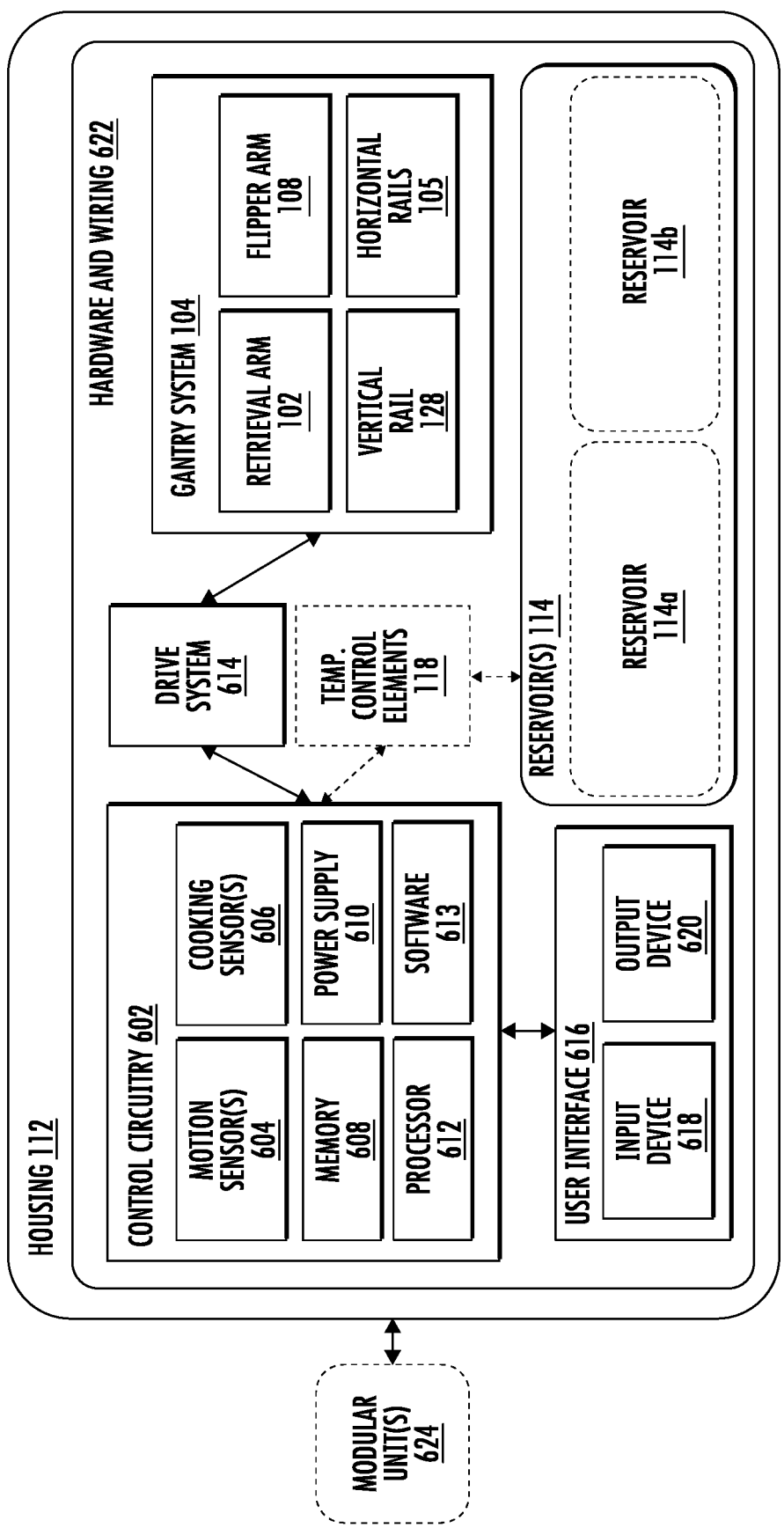

FIG. 5 illustrates the relative positioning of elements of the automated food preparation system during operation according to various embodiments; and FIG. 6 illustrates a schematic view of the automated food preparation system and related circuitry components.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements.

The terms "illustrative" and "exemplary" are used to be examples with no indication of quality level. As used herein, the terms "approximately," "generally," and "substantially" refer to within manufacturing and/or engineering design tolerances for the corresponding materials and/or elements as would be understood by the person of ordinary skill in the art, unless otherwise indicated.

As used herein, reference is made to an automated food preparation system for use in conjunction with preparation of one or more food items. The present disclosure, however, contemplates that the automated food preparation system of the present disclosure may be equally applicable to other applications in which moving, retrieving, depositing, emptying, filling, sorting, and/or manipulating food containers is advantageous. Similarly, reference herein may be made to food service environments, such as restaurant kitchens, in which at least some of the various embodiments may be implemented. The present disclosure, however, may also be applicable to other environments.

Additionally, reference herein may be made to a "cooking medium," such as cooking oil, in which one or more food items may be submerged in order to sufficiently cook (e.g. fry) a food item for customer consumption. The present disclosure, however, contemplates that the automated food preparation system may also be used with any other cooking medium (e.g., water, microwaves, air, etc.) and/or used in various embodiments without a cooking medium. Furthermore, reference herein may be made to use of the automated food preparation system in conjunction with a "cooking operation". The present disclosure, however, contemplates that the automated food preparation system may be equally applicable to other applications in which timed exposure of food items to various environments and elements (e.g., thawing, freezing, submersion, rinsing, or storage of items, or the like) is desired. Like numbers refer to like elements throughout.

Overview

The food service industry is often looking for ways to increase productivity while maintaining or reducing staffing requirements. In particular, restaurants bear substantial costs associated with hiring and maintaining a sufficiently large staff to process a similarly large customer demand for food during short time intervals (e.g., breakfast, lunch, and/or dinner). Traditionally, staff members may each be assigned one or more tasks (e.g., customer interaction, food preparation, etc.) within the restaurant and may, due to the limitations of conventional cooking equipment, be required to frequently monitor or physically attend to portions of these tasks. By way of example, a staff member may be assigned to frying one or more food items to fulfil customer orders. In doing so, the staff member may be required to monitor (e.g., be physically located near) a frying station to ensure the correct amount of food items are prepared as well as to ensure the food items are cooked for a sufficient amount of time. In this way, conventional food preparation equipment limits the availability of staff to perform multiple or simultaneous tasks and further requires an increased number of staff to ensure timely fulfilment of customer orders.

To solve these issues and others, example implementations of embodiments of the present application may provide an automated food preparation system that allows for automated cooking (e.g., submersion and retrieval of one or more food items in/from a cooking medium) and automated removal of the cooked food items (e.g., removed from the cooking area/frying system). In this way, the automated food preparation system described hereafter allows for tasks that require food items to cook for a set amount of time (e.g., frying waffle fries, frying chicken nuggets, etc.) to be performed without constant operator attention such that food preparers may instead perform additional tasks (e.g., assemble orders, clean, etc.) during the same period of time required for the automated gantry frying to operate. In doing so, the automated food preparation system may allow increased staffing flexibility by alleviating the cost and scheduling requirements associated with high demand periods that may only constitute a small portion of the working day. Furthermore, the automated food preparation system may further operate to limit exposure of staff to potentially dangerous cooking elements and/or eliminate tasks associated with an increased risk of injury.

With reference to FIG. 1A, an example automated food preparation system 100 for use with frying food items is illustrated. Regardless of the configuration or orientation of the components described hereafter, the automated food preparation system 100 of the present disclosure may be configured with at least a housing 112, frame, or other enclosure, in which one or more reservoirs 114a and 114b may be defined, a flipper arm 108 (e.g., ejection mechanism), a retrieval arm 102, and a gantry system 104. By way of example, the automated food preparation system may include the housing 112 formed of a corrosion resistant food grade material (e.g., stainless steel or the like) that defines at least a partial enclosure for supporting or otherwise containing a cooking medium (e.g., cooking or frying oil) therein. The housing 112 may further support various temperature control elements, electrical circuitry, and mechanical devices as described hereafter for controlling and facilitating cooking operation and movement of the automated food preparation system 100. In order to prevent damage, due to the temperature of the cooking medium within the reservoirs 114a, 114b, to the sensors and/or circuitry described hereafter, one or more of these elements may be enclosed or otherwise shielded from the cooking medium.

The housing 112 may further define one or more openings configured to allow selective access to the first reservoir 114a and/or second reservoir 114b. As shown in FIG. 1A, the housing 112 may be formed such that t two reservoirs 114a, 114b are defined with corresponding openings that allow access to the contents (e.g., baskets 106) within the respective reservoirs 114a, 114b. In some embodiments, the reservoirs 114a, 114b may sealed with one or more tops, lids, or the like (not shown) to minimize the amount of heat exchanged (e.g., dissipated) by the cooking medium (e.g., frying or cooking oil) within the reservoirs 114a, 114b and an external environment. In such an embodiment, the lid(s) (not shown) for each reservoir 114a, 114b may further act to shield a user or otherwise decrease the risk of oil splatter during a cooking operation. The housing 112 may, in some embodiments, be formed of a high-density thermal insulating material (e.g., resistant to the high temperatures of the cooking medium).

In some instances, the automated food preparation system 100 may include various racks, shelves, containers, dispensers, etc. (e.g., collection tray 120 as shown in FIGS. 1C-1E) for supporting one or more food items therein before and/or after a cooking operation. The automated food preparation system 100 may also be formed as a module of a larger restaurant kitchen unit (e.g., a modular component) including other apparatuses for food item preparation and/or storage at various stages (e.g., refrigerators, freezers, microwaves, warming lamps, conveyor belts, etc.). The automated food preparation system may be attached to other modular units via sides 116a, 116b, 116c, and/or 116d of the housing 112.

During operation, one or more food items may be submerged in the cooking medium supported by the reservoirs 114a, 114b of the housing 112 so as to perform a cooking operation (e.g., frying). In some instances, the food items (e.g., a bag of frozen fries) may also be enclosed (e.g., within pouches, bags, containers, and/or the like) before placed in the cooking medium. As such, the automated food preparation system 100 may, in some embodiments, include one or more baskets 106 for supporting one or more food items during a cooking operation. As described hereafter, the one or more baskets 106 may be moved relative the housing 112 by a retrieval arm 102 of the gantry system 104 described hereafter. In order to allow sufficient contact with the cooking medium, the one or more baskets 106 may be porous (e.g., a wire mesh or the like) or otherwise include an opening to receive cooking medium therein.

As described hereafter, the automated food preparation system 100 may include a flipper arm 108 (e.g., ejection mechanism) configured to facilitate removal of one or more food items within a basket 106. The flipper arm 108 (e.g., ejection mechanism) may include an adjustable stopper pin 108a and an adjustment channel 108b attached to or integrated into the flipper arm 108 (e.g., ejection mechanism). The adjustable stopper pin 108a and adjustment channel 108b may be configured to allow adjustment of the flipper arm 108 (e.g., ejection mechanism) in order to receive baskets 106 of different sizes and shapes as well as baskets 106 having different attachment features. The flipper arm 108 (e.g., ejection mechanism) may, in an instance in which a basket 106 is received by the flipper arm 108 (e.g., ejection mechanism), rotate about a motor shaft 110 so as to cause the contents (e.g., food items) of the basket 106 to be expelled, ejected, or otherwise removed (e.g., a snapping action). As shown, the flipper arm 108 (e.g., ejection mechanism) may define an elongate member that extends from a pivotal attachment (e.g., motor shaft 110) with the housing 112. Additionally, the motor shaft 110 located at the pivotal engagement between the flipper arm 108 (e.g., ejection mechanism) and the housing 112 may operate to rotate the elongate member from a first position configured to receive the basket (as shown in FIG. 3G) and a second position opposite the first position at which the contents of the basket are ejected (as shown in FIG. 3H).

With reference to FIG. 1B, the automated food preparation system 100 may include a retrieval arm 102 configured to engage with at least one of the baskets 106 and facilitate movement of the baskets 106 about the housing 112. The retrieval arm 102 may define an attachment apparatus 102a disposed at a free end of the retrieval arm 102 (e.g., an end of the retrieval arm 102 that extends at least partially into the reservoirs 114a, 114b). While illustrated herein as an extension or protrusion, the attachment apparatus 102a may include any engagement feature (e.g., hooks, claws, magnets, suction hoses, suction cups, adhesive substances, clips, fixed or retractable loops, ropes, wires, chains, and/or the like). Furthermore, the retrieval arm 102 may be formed as a flexible structure, rigid structure, or any combination thereof based upon the intended application of the automated food preparation system 100. In some embodiments, the retrieval arm 102 may include one or more position sensors (not shown) for determining the relative position of the retrieval arm 102 within the housing 112 of the automated food preparation system 100. As shown in FIG. 1B, the attachment apparatus 102a may be configured to interface or otherwise engage with the attachment point 106a of the basket 106 (as shown in FIG. 3D).

With reference to FIG. 1C and FIG. 1D, the automated food preparation system 100 may include a temperature control element 118 (e.g., direct or indirect heating elements, electric coils, gas burners, gas conveying tubes, convection tubes, chemical fuels, etc.) that is thermally engaged with the cooking medium and configured to impart heat to the cooking medium (e.g., cooking of frying oil) so as to warm the cooking medium to a sufficient temperature for cooking one or more food items therein (e.g., modify the temperature of the cooking medium). The temperature control element 118 may, in some embodiments, be supported within the reservoirs 114a, 114b. As noted above, in some embodiments, the automated food preparation system 100 may include one or more reservoir sensors 124 (e.g., temperature sensor(s)). As shown, the one or more reservoir sensors 124 may be positioned at any suitable location within the reservoirs 114a, 114b so as to measure at least one characteristic of the contents (e.g., cooking medium) of the reservoir 114a, 114b (e.g., temperature, humidity, pressure, weight, density, viscosity, light reflection, light refraction, location relative to other system components, etc.). In some example embodiments the reservoir sensor(s) 124 may include at least one of a thermometer, thermistor, thermocouple, flow sensor, or the like in thermal engagement with the reservoirs 114a, 114b.

With reference to FIG. 1D, the automated food preparation system 100 may include one or more limit sensor(s) 126 (e.g., position sensors) positioned adjacent one or more corresponding ends of the horizontal rails 105 described hereafter. The one or more limit sensor(s) 126 (e.g., limit switch, proximity sensor, capacitive sensor, precision touch sensor, magnetic sensor, laser sensors, optical sensors, motion sensors, position sensors, scanning devices, or the like) may be configured to provide a signal to the gantry control circuitry described hereafter indicating that the gantry 132 is located at the end of the horizontal rails 105 and/or the vertical rail 128 as described hereafter. Furthermore, in at least some embodiments, the one or more limit sensor(s) 126 may generate a signal indicative of one or more positions of the gantry 132 along the horizontal rails 105 and/or the vertical rail 128.

With reference to FIG. 1E, the automated food preparation system 100 may include a gantry system 104 connected to or otherwise including the retrieval arm 102 described above. As described hereafter, the gantry system 104 may be configured to cause vertical movement, horizontal movement, or any combination thereof of the retrieval arm 102.

As illustrated in FIG. 1E, the gantry system 104 may include horizontal rails 105, a coupling shaft 130, a vertical rail 128, and a gantry 132. The gantry system 104 may be, in some embodiments, supported by or partially enclosed by the housing 112. The gantry system 104 may, in other embodiments, be positioned outside of the housing 112 encircled by a guard rail 134. The guard rail 134 may be formed a single piece of tubing as illustrated, a set of rails or tubing, an additional housing component attached to the housing 112, grating, another physical barrier to cover the gantry system 104, and/or one or more electric sensors (e.g., light curtain safety apparatus, proximity sensor array, etc.) to prevent contact and/or damage to the gantry system components. Although illustrated and described herein with reference to a gantry system 104 attached to the housing 112, the present disclosure contemplates that the gantry system 104 may operate as a modular component separate from the housing 112 (e.g., attachable to or positioned proximate the housing 112).

In some embodiments, the gantry 132 that includes the retrieval arm 102 may be supported by the horizontal rails 105 to facilitate linear motion of the gantry (and retrieval arm 102) in a horizontal direction of travel. Translation of the gantry 132 along the horizontal rails 105 may be caused by a drive system (e.g., belt, chain, servos, linear and/or rotary actuators, lead screw and nut, rack and pinion, bearing and race, linear electromagnet, etc.). The horizontal rails 105 may be formed as linear members as illustrated in FIG. 1D or may be formed with curved and/or angled sections to provide for any direction of travel of the gantry 132. Furthermore, the drive system of the gantry 132 may be assigned to a single rail with additional rails only used to restrain motion along particular directions. For example, the gantry system 104 may include a drive motor 136 directly connected to a lower horizontal rail 105 and then coupled to an upper horizontal rail 105 via the coupling shaft 130.

Similarly, in some embodiments, the gantry 132 may also be supported by a vertical rail 128 configured to facilitate linear motion of the gantry (and retrieval arm 102) in a vertical direction of travel. Translation of the gantry 132 along the vertical rail 128 may also be caused by a drive system (e.g., belt, chain, servos, linear and/or rotary actuators, lead screw and nut, rack and pinion, bearing and race, linear electromagnet, etc.). The vertical rail 128 may be formed as a linear member as illustrated in FIG. 1D or may be formed with curved and/or angled sections to provide for any direction of travel of the gantry 132. Furthermore, the drive motor 136 may be connected to the vertical rail 128 so as to drive the gantry 132 in a vertical direction. Said differently, the drive system may include the vertical rail 128, the horizontal rail 105, and/or the drive motor 136.

Movement Operation Cycle

With reference to FIG. 2, a flow chart depicting a movement operation cycle 200 (e.g., cycle 200) of the automated food preparation system 100 of FIGS. 1A-1E is illustrated. The method steps described herein should not be read to restrict movement to a single coordinate system (e.g., cartesian, polar, etc.) or type of direction of movement (e.g., linear, rotational, circular, arcing, horizontal, vertical, diagonal, etc.). Furthermore, the present disclosure contemplates that multiple and/or duplicate components of the system may move simultaneously during the cycle 200. For example, the first reservoir 114a and second reservoir 114b may each be associated with a single flipper arm 108 (e.g., ejection mechanism), a set of multiple flipper arms, and/or multiple retrieval arm(s) 102. Performance of the cycle 200 of FIG. 2 is described hereafter with reference to the positions illustrated in FIGS. 3A-3H in which a basket 106 is moved from the second reservoir 114b. Performance of an alternative movement operation cycle of the automated food preparation system 100 is described hereafter with reference to the positions illustrated in FIGS. 4A-4I in which a basket 106 is moved from the first reservoir 114a.

As described hereafter, the cycle 200 of the automated food preparation system 100 may operate to engage one or more baskets 106 supporting one or more food items cooking in the reservoirs 114a, 114b. As illustrated in FIGS. 3A-3H, operation of the cycle 200 is described with respect to the second reservoir 114b. Performance of the cycle 200 may, in some embodiments, be initiated by a user (e.g., via a user interface 616) or may, in other embodiments, be automatically initiated (e.g., via a processor 612 or the like). During operation, the retrieval arm 102 may move, via the horizontal rails 105 and/or the vertical rail 128, so as to engage one or more baskets via the attachment apparatus 102a. Once engaged with the basket 106, the retrieval arm 102 may lift (e.g., move vertically) the basket 106 via engagement with the attachment apparatus 102a so as to remove the one or more food items within the basket 106 from the cooking medium within the respective reservoir 114a, 114b. The retrieval arm 102 may translate with the engaged basket 106 (e.g., move horizontally) in order to interface with the flipper arm 108 (e.g., ejection mechanism). In particular, the flipper arm 108 may engage with the basket 106 while the basket 106 is supported by the attachment apparatus 102a (e.g., a first position of the ejection mechanism). The retrieval arm 102 may then move vertically such that the attachment apparatus 102a disengages with the basket 106 such that the flipper arm 108 is supporting the basket 106. The flipper arm 108 may rotate about a fixed point (e.g., the motor shaft 110 at the fixed end of the flipper arm 108) such that the moving with the basket 106 engaged with the flipper arm 108 similarly moves and expels/ejects the one or more food item(s) from the basket 106. Following removal of the one or more food items from the basket 106, the retrieval arm 102 may reengage the basket 106 and perform the cycle 200 in reverse so as to return the basket 106 to its original location in the respective reservoir 114a, 114b.

In particular, the cycle 200 may include a start operation 201 in which a basket 106 is loaded with one or more food items. In some instances, the start operation 201 may refer to a position of the basket 106 (e.g., the basket 106 to be loaded with one or more food items) positioned within a respective reservoir 114ab, 114b. In other instances, the start operation 201 may refer to a position in which the attachment apparatus 102a of the retrieval arm 102 is engaged with the basket 106 and lifts the basket from the respective reservoir 114a, 114b (e.g., removes the basket 106 from the cooking medium). For the sake of clarity and convenience of description, the cooking medium (e.g., frying oil) and food items are not illustrated in FIGS. 3-4 as described hereafter. In any embodiment, the cycle 200 may include a loading or idle position at any location along the movement path for manually or automatically receiving one or more food items therein. Additionally, the cycle 200 may include a loading position in which the basket 106 is positioned separate from the reservoirs 114a, 114b (e.g., located proximate position 4c in FIG. 5).

Figure 3C:
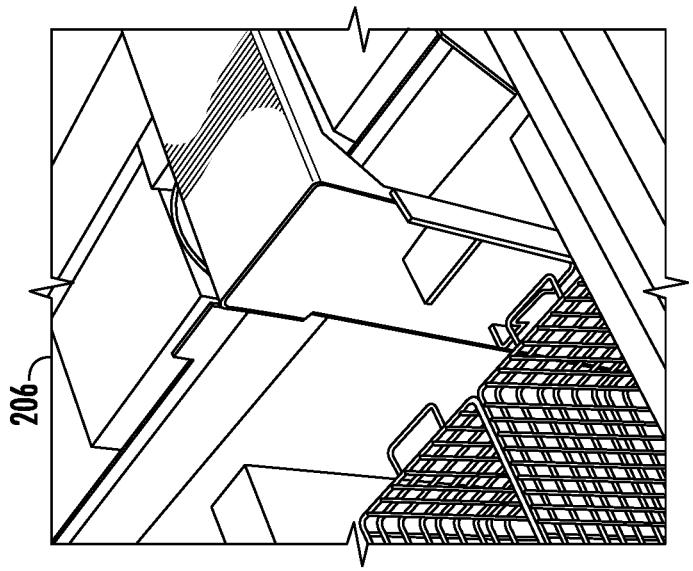
Figure 3B:
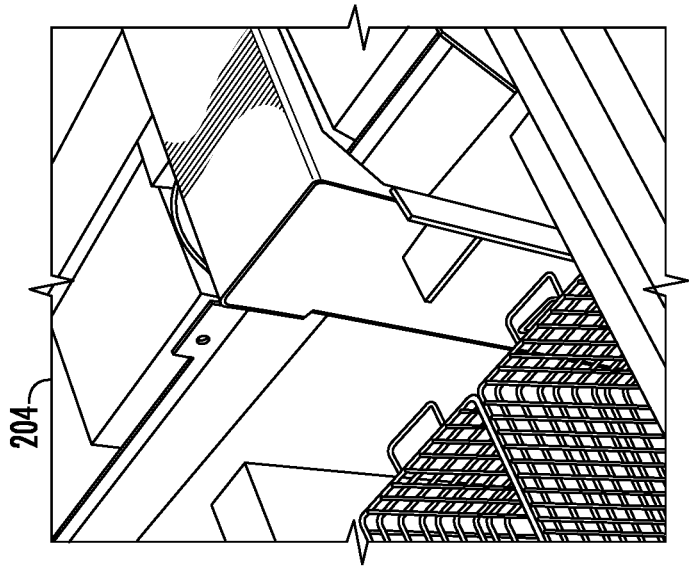
Figure 3A:
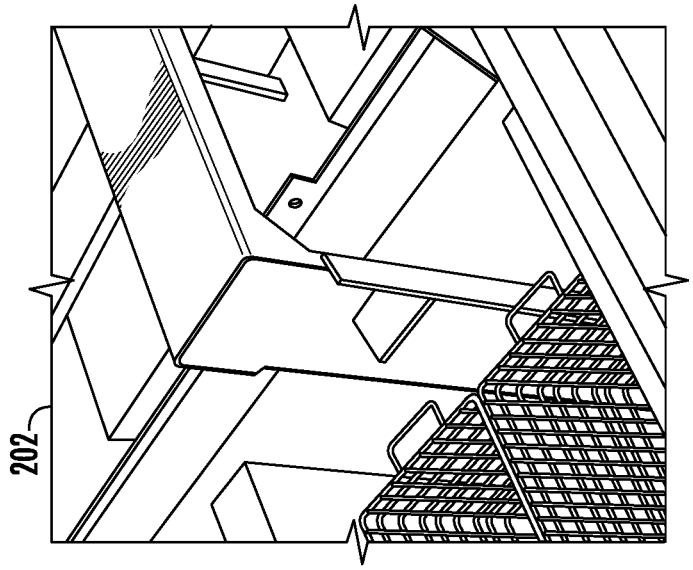

Once one or more food items are located within the basket 106 (e.g., via manual placement by a user and/or an automated process), the cycle 200 may include operation 202 in which the attachment apparatus 102a of the retrieval arm 102 is located in position 1 as shown in FIG. 3A. In some instances, position 1 may refer to a resting or default position of the retrieval arm prior to performing operations of the cycle 200. As shown in FIG. 3A, position 1 may be located between the baskets 106 within the second reservoir 114b and vertically below the attachment points 106a of the baskets 106. Once cooking of the one or more food items (not shown) within the basket 106 is complete, the cycle 200 may include operation 204 in which the retrieval arm 102 may (e.g., in response to an instruction from the processor 612 or the like) move to position 2 as shown in FIG. 3B. As illustrated, position 2 may refer to a location of the retrieval arm 102 vertically below the basket 106.

The cycle 200 may further include operation 206 in which the retrieval arm 102 and attachment apparatus 102a move to position 3. As shown in FIG. 3C, at position 3 the attachment apparatus 102a may interface with the corresponding attachment point 106a of the basket 106. The cycle 200 may further include operation 208 in which the retrieval arm 102 moves to position 4 as shown in FIG. 3D. Due to the engagement between the attachment apparatus 102a and attachment point 106a, the basket 106 may also be moved to position 4 such that the basket 106 is removed from the second reservoir 114b. Said differently, position 4 may refer to an instance in which the one or more food items (not shown) within the basket 106 are removed from the cooking medium.

The cycle 200 may further include operation 210 in which the retrieval arm 102 and engaged basket 106 may move to position 5 as shown in FIG. 3E. As illustrated, the basket 106 may be moved horizontally via movement of the engaged retrieval arm 102 (e.g., via the horizontal rails 105) from position 4 located vertically above the second reservoir 114b to position 5 proximate the flipper arm 108. The cycle 200 may further include operation 212 in which the retrieval arm 102 moves to position 6 such that the basket 106 engages the flipper arm 108. As shown in FIG. 3F, the basket 106 may define one or more slots, rings, etc. configured to receive the flipper arm 108 therein.

Following engagement between the flipper arm 108 and the basket 106, the cycle 200 may include operation 214 in which the retrieval arm 102 moves to a position 7. As shown in FIG. 3G (e.g., first position of ejection mechanism), the retrieval arm 102 may, in some embodiments, move vertically such that the attachment apparatus 102a disengages from the corresponding attachment point 106a of the basket 106. In other embodiments, location of the retrieval arm 102 at position 6 may not impede operation of the flipper arm 108. In such an embodiment, the retrieval arm may remain located at position 6 and disengagement of the attachment apparatus 102a from the basket 106 may be performed via movement of the flipper arm 108 as described hereafter.

Following disengagement between the attachment apparatus 102a and the basket 106, the cycle 200 may include operation 216 in which the flipper arm 108 rotates about a fixed point so as to expel, eject, or otherwise cause removal of the contents of the basket 106 at position 8. As shown in FIG. 3H (e.g., second position of ejection mechanism), the flipper arm 108 engaged with the basket 106 may rotate about a fixed point (e.g., the motor shaft 110) so as to expel, dump, or otherwise remove the contents of the basket 106 to a collection tray 120 located proximate position 8. As described herein, the rotation of the flipper arm 108, and by association the basket 106, about the fixed point may be sufficiently fast so as to force removal of the contents of the basket 106. Furthermore, the movement path of the flipper arm 108 may halt abruptly (e.g., snap) so as to further urge removal of the food items within the basket. In particular, food items that might otherwise remain stuck to the sides or bottom of the basket after slow inversion of the basket, may advantageously be ejected by the abrupt stop so as to eliminate the need for a user to tap the basket or otherwise manually remove the remaining food items. As described above, following removal of the one or more food items from the basket 106, the retrieval arm 102 may reengage the basket 106 and perform the cycle 200 in reverse so as to return the basket 106 to its original location in the respective reservoir 114a, 114b.

With reference to FIGS. 4A-4I, performance of another movement operation cycle 400 (e.g., cycle 400) of the automated food preparation system 100 is described with reference to the first reservoir 114a and illustrated. As illustrated in FIGS. 1A-1B, the flipper arm 108 of the automated food preparation system 100 may be located vertically above the cooking location of at least one of the baskets 106 (e.g., above first reservoir 114a). As such, the flipper arm 108 may, in such an embodiment, be positioned such that its resting location impedes movement of the retrieval arm 102 and any engaged baskets 106. In order to prevent unintended contact between the flipper arm 108 and the retrieval arm 102 and/or basket 106 during operation, the automated food preparation system 100 may employ an alternative movement operation cycle 400.

Figure 4B:
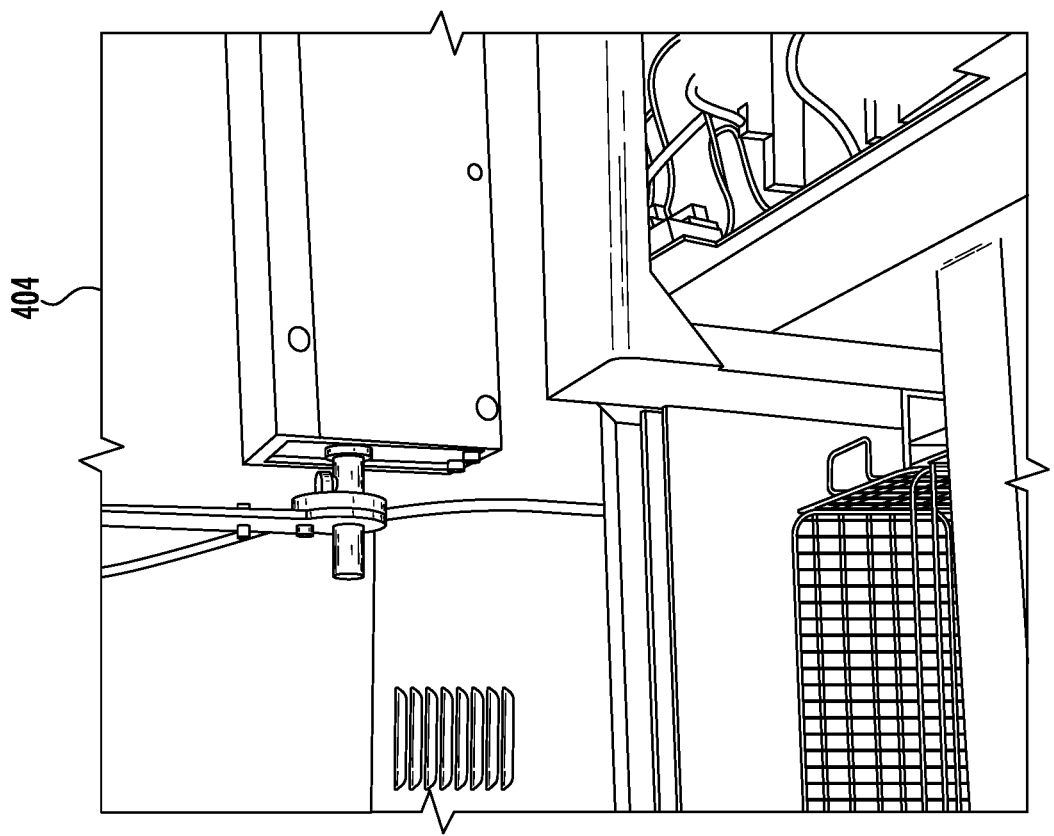
Figure 4A:
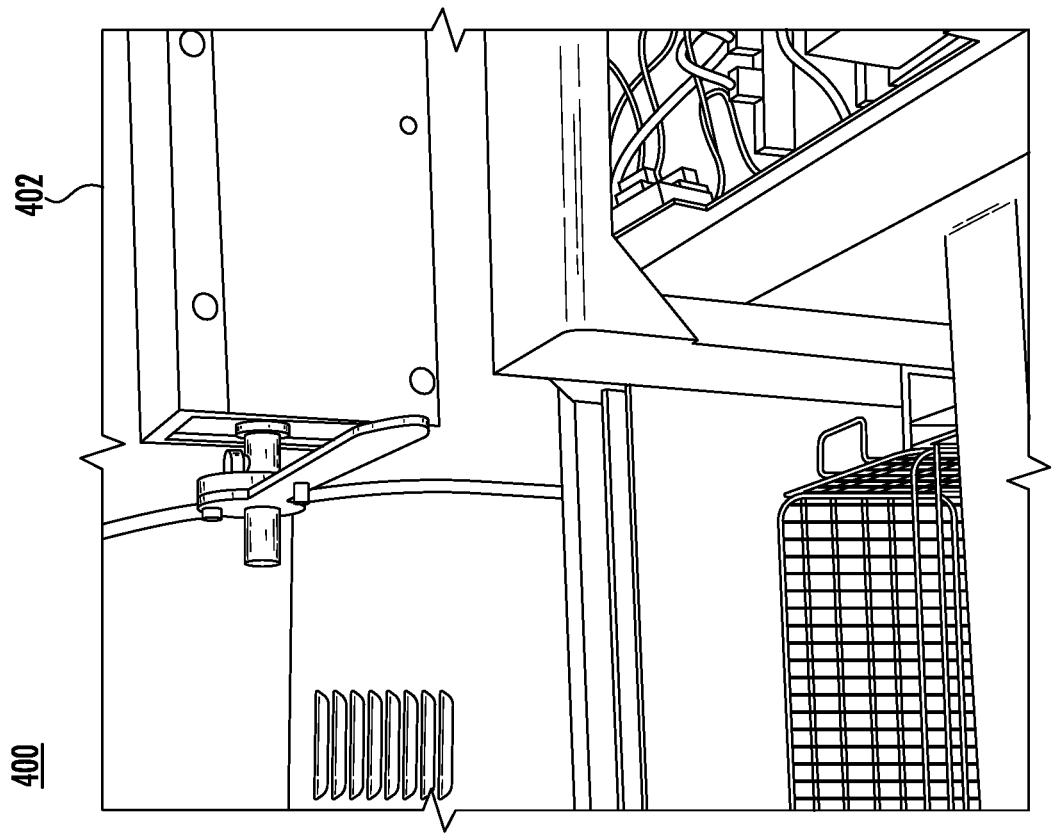

With reference to FIG. 4A, the cycle 400 may include an operation 402 in which the attachment apparatus 102a of the retrieval arm 102 is located in position 1. As described above, position 1 may refer to a resting or default position of the retrieval arm 102 prior to performing operations of the cycle 400. As shown in FIG. 4A, position 1 may be located between the baskets 106 within the first reservoir 114a and vertically below the attachment points 106a of the baskets 106. Furthermore, as shown in FIG. 4A, the flipper arm 108 is positioned in a default or resting position 6 (e.g., at least partially disposed above a basket 106). The cycle 400 may further include operation 404 in which the retrieval arm 102 is moved to a position 2 as shown in FIG. 4B and the flipper arm 108 is moved to a position 8'. As illustrated, position 2 of the retrieval arm 102 may refer to a location of the retrieval arm 102 vertically below the basket 106. Position 8' may refer to a position in which the flipper arm 108 is substantially removed from the path of vertical movement of the retrieval arm 102. Said differently, the flipper arm 108 may rotate about a fixed point to any position so long as the retrieval arm 102, and engaged basket 106 as described hereafter, may move vertically without contact with the flipper arm 108.

With reference to FIG. 4C, the cycle 400 may include an operation 406 in which the retrieval arm 102 and attachment apparatus 102a move to position 3 as described above. At position 3, the attachment apparatus 102a may interface with the corresponding attachment point 106a of the basket 106. The cycle 400 may further include operation 408 in which the retrieval arm 102 moves to position 4 as shown in FIG. 4D. Due to the engagement between the attachment apparatus 102a and attachment point 106a, the basket 106 may also be moved to position 4 such that the basket 106 is removed from the first reservoir 114a. Given that the flipper arm 108 is located at position 8', the retrieval arm 102 and engaged basket 106 may be located proximate the flipper arm 108 (e.g., at position 6 or the default position for the flipper arm 108).

With reference to FIG. 4E, the cycle 400 may include operation 410 in which the retrieval arm 102 and engaged basket 106 may move to position 5. As illustrated, the basket 106 may be moved horizontally via movement of the engaged retrieval arm 102 (e.g., via the horizontal rails 105) from position 4 located vertically above the first reservoir 114a (e.g., in the default position of the flipper arm 108) to position 5 adjacent the flipper arm 108. Additionally, the flipper arm 108 may, at operation 412, move from position 8' to position 6 as shown in FIG. 4F. As described above, in some instances, the flipper arm 108 may be located in the movement path of the retrieval arm 102. As illustrated in FIGS. 4E-4F, however, the flipper arm 108 may move to a position 8' such that the retrieval arm 102 and basket 106 may move from the first reservoir 114a to a position removed from the cooking medium and further translate so as to provide space for the flipper arm 108 to return to a resting position (e.g., position 6). The cycle 400 may further include operation 414 in which the retrieval arm 102 returns to position 6 such that the basket 106 engages the flipper arm 108. As shown in FIG. 4G, the basket 106 may define one or more slots, rings, etc. configured to receive the flipper arm 108 therein.

As described above, following engagement between the flipper arm 108 and the basket 106, the cycle 400 may include operation 416 in which the retrieval arm 102 moves to a position 7. As shown in FIG. 4H, the retrieval arm 102 may, in some embodiments, move vertically such that the attachment apparatus 102a disengages from the corresponding attachment point 106a of the basket 106. In other embodiments, location of the retrieval arm 102 at position 6 may not impede operation of the flipper arm 108. In such an embodiment, the retrieval arm may remain located at position 6 and disengagement of the attachment apparatus 102a from the basket 106 may be performed via movement of the flipper arm 108 as described hereafter.

Figure 4I:
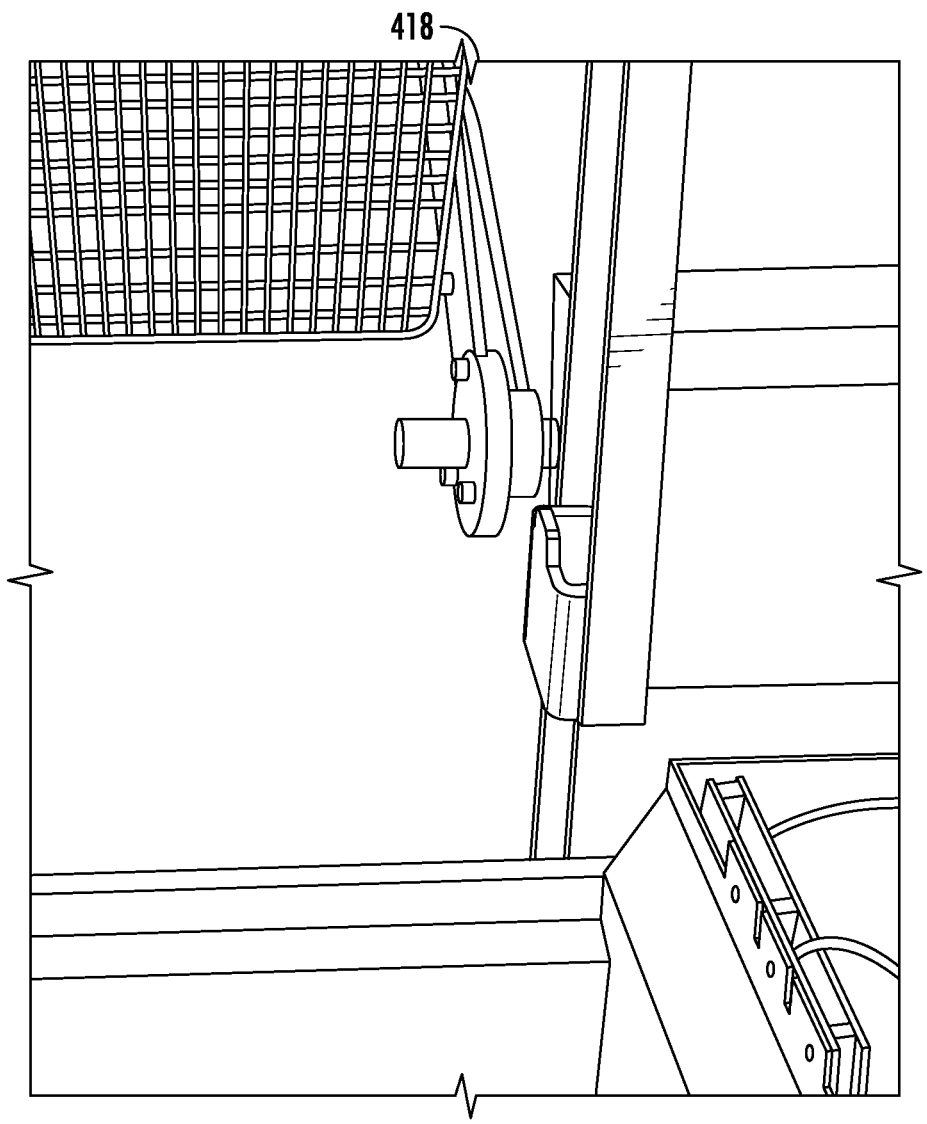

Similar to the operation of cycle 200, following disengagement between the attachment apparatus 102a and the basket 106, the cycle 400 may include operation 418 in which the flipper arm 108 rotates about a fixed point so as to expel the contents of the basket 106 at position 8. As shown in FIG. 4I, the flipper arm 108 engaged with the basket 106 may rotate about a fixed point (e.g., the motor shaft 110) so as to expel, dump, or otherwise remove the contents of the basket 106 to a collection tray 120 located proximate position 8. As described herein, the rotation of the flipper arm 108, and by association the basket 106), about the fixed point may be sufficiently fast so as to force removal of the contents of the basket 106. Furthermore, the movement path of the flipper arm 108 may halt abruptly (e.g., snap) so as to further urge removal of the food items within the basket. As described above, following removal of the one or more food items from the basket 106, the retrieval arm 102 may reengage the basket 106 and perform the cycle 400 in reverse so as to return the basket 106 to its original location in the first reservoir 114a.

FIG. 5 illustrates the relative positioning of the retrieval arm 102 and the flipper arm 108 of the automated food preparation system 100 during movement operation cycles according to various embodiments. As shown, FIG. 5 depicts the positions (e.g., positions 1-8) for the retrieval arm 102 and engaged basket 106 as well as the flipper arm 108 during operation of the cycles 200 and 400 illustrated in FIGS. 2-4I. While described and illustrated herein with reference to linear motion of the retrieval arm 102 (e.g., either horizontal or vertical movement) the present disclosure contemplates that the movement of the retrieval arm 102 may follow any movement path (e.g., angled, arced, or the like) based upon the intended application of the automated food preparation system 100. As described above, the automated food preparation system 100 thereby allows for tasks that require food items to cook for a set amount of time (e.g., frying waffle fries, frying chicken tenders, etc.) to be performed without constant operator attention such that food preparers may instead perform additional tasks (e.g., assemble orders, clean, etc.) during the same period of time required for the automated gantry frying to operate. As such, the automated food preparation system 100 may further provide increased staffing flexibility by alleviating the cost and scheduling requirements associated with high demand periods that may only constitute a small portion of the working day.

With reference to FIG. 6, a schematic view of the automated food preparation system and related circuitry components is provided. As described above, the housing 112 may enclose or otherwise support the various structural components of the automated food preparation system 100 (e.g., directly and/or indirectly). In some embodiments, the automated food preparation system 100 may be formed as a modular system such that additional modular units 624 (e.g., refrigeration systems, storage containers, collection tray 120 etc.) may be connected to or otherwise operate in conjunction with the system 100 described above.

In addition to the structural components of the automated food preparation system 100, as shown in FIG. 6, one or more circuitry components may be employed to control operation of the elements described herein. For example, the automated food preparation system 100 may include control circuitry 602 configured to, in whole or in part, control operation of the retrieval arm 102 and the flipper arm 108 (e.g., ejection mechanism). The control circuitry 602 may include a memory 608, processor 612, power supply 610, software 613, cooking sensor(s) 606, motion sensor(s) 604, or the like. In an example embodiment, the processor 612 may be configured to execute instructions stored in the memory 608 or otherwise accessible to the processor 612. Whether configured by hardware or by a combination of hardware with software, the processor 612 may represent an entity (e.g., physically embodied in circuitry) capable of performing operations according to an embodiment of the present invention while configured accordingly. By way of example, the processor 612 may receive instructions from the memory 604 for controlling movement of the retrieval arm 102. The processor 612 may further receive sensor data from the position sensors/motion sensors 604 (e.g., optical sensors, limit switches, etc.), and/or the temperature sensors/cooking sensor 606 (e.g., temperature sensors, humidity sensors, timers, etc.) and control movement of the retrieval arm based upon the sensor data.

The automated food preparation system 100 may further include a drive system 614 that includes a motor (e.g., DC motors, servo motors, or the like), the horizontal rail(s) 105, and/or the vertical rail(s) 128. Furthermore, the drive system 614 may employ a gearbox, linear actuator, belts, chains, lead screws, couplings, and/or any other components necessary to drive operation of the gantry system 104, the retrieval arm 102, and/or the flipper arm 108. In some embodiments, the drive system 614 may include a first actuator associated with the horizontal rail 105 and configured to drive movement thereof. In some embodiments, the drive system 614 may include a second actuator associated with the vertical rail 128 and configured to drive movement thereof. The gantry system 104, as illustrated in FIG. 6 and described above with reference to FIGS. 1A-1E may include the retrieval arm 102, the flipper arm 108, the attachment apparatus 102a, the horizontal rails 105, the vertical rail 128, and/or any additional specialized rail components (e.g., bearings, bushing, races, angle brackets, angle irons, box beams, I-beams, rack-and-pinion, worm gears, channel, magnets, etc.) as necessary to control operation thereof.

In some embodiments, the automated food preparation system 100 may include a user interface 616 to facilitate user interaction and operation, if necessary, of the system elements described above. As shown, the user interface 616 may include an input device 618 (e.g., keyboard, touch screen, touch pad, buttons, dials, switches, levers, toggles, sliders, camera, scanner, mouse, joystick, biometric sensor, microphone, etc.) and/or an output device 620 (e.g., screen, speakers, lights, buzzer, signal emitter, printer, etc.).

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for preparing food in at least one basket in a housing, wherein the method comprises:
   engaging the basket with a retrieval arm;
   moving the retrieval arm at least one of vertically and horizontally relative to the housing with the basket engaged therewith, wherein the basket is moved adjacent to an edge of the housing;
   engaging the basket with an ejection mechanism;
   disengaging the basket from the retrieval arm; and,
   ejecting the food from the basket by operating the ejection mechanism.

2. A method of preparing food according to claim 1, wherein, prior to engaging the basket with the retrieval arm, the food is fried within heated oil in the housing.

3. A method of preparing food according to claim 1, wherein the moving step comprises moving the retrieval arm along at least one of a vertical rail and a horizontal rail.

4. A method of preparing food according to claim 3, wherein the moving step further comprises moving the retrieval arm along both a vertical rail and a horizontal rail, and wherein the vertical rail and horizontal rail are both mounted to the housing.

5. A method preparing food according to claim 1, further comprising detecting the position of the retrieval arm relative to the housing.

6. A method of preparing food according to claim 1, wherein operating the ejection mechanism further comprises rotating an elongate member, wherein one end of the elongate member is engaged with the basket.

7. A method of preparing food according to claim 6, wherein rotating the elongate member further comprises rotating a second end of the elongate member about an attachment to the housing.

8. A method of preparing food according to claim 7, further comprising rotating a motor shaft attached to the second end of the elongate member.

9. A method of preparing food according to claim 8, further comprising:
   rotating the motor shaft to rotate the elongate member from a first position to a second position;
   terminating the rotation of the motor shaft when the elongate member is at the second position; and
   abruptly halting the rotation of the elongate member to eject the food product from the basket.

10. A method of preparing food according to claim 1, wherein moving the retrieval arm further comprises moving the retrieval arm simultaneously in vertical and horizontal directions relative to the housing.

\* \* \* \* \*

UNITED STATES PATENT AND TRADEMARK OFFICE
CERTIFICATE OF CORRECTION

PATENT NO. : 12,137,839 B2
APPLICATION NO. : 18/187075
DATED : November 12, 2024
INVENTOR(S) : Ryan HenneBarrows et al.

It is certified that error appears in the above-identified patent and that said Letters Patent is hereby corrected as shown below:

In the Claims

In Column 14, Line 12, Claim 5, delete "method" and insert -- method of --, therefor.

Signed and Sealed this
Eleventh Day of February, 2025

Coke Morgan Stewart
*Acting Director of the United States Patent and Trademark Office*